(12) United States Patent
Dwane (10) Patent No.: US 11,023,673 B2
(45) Date of Patent: Jun. 1, 2021

(54) ESTABLISHING A PROFICIENCY BASELINE FOR ANY DOMAIN SPECIFIC NATURAL LANGUAGE PROCESSING

(71) Applicant: Dell Products L.P., Round Rock, TX (US)

(72) Inventor: Patrick Dwane, Mitchelstown (IE)

(73) Assignee: Dell Products L.P., Round Rock, TX (US)

( * ) Notice: Subject to any disclaimer, the term of this patent is extended or adjusted under 35 U.S.C. 154(b) by 201 days.

(21) Appl. No.: 15/942,948

(22) Filed: Apr. 2, 2018

(65) Prior Publication Data

US 2019/0303273 A1    Oct. 3, 2019

(51) Int. Cl.
*G06F 11/36* (2006.01)
*G06F 40/20* (2020.01)
*G06F 40/284* (2020.01)

(52) U.S. Cl.
CPC .......... *G06F 40/20* (2020.01); *G06F 11/3664* (2013.01); *G06F 11/3684* (2013.01); *G06F 40/284* (2020.01)

(58) Field of Classification Search
CPC ....................................................... G06F 11/36
See application file for complete search history.

(56) References Cited

U.S. PATENT DOCUMENTS

| | | | |
|---|---|---|---|
| 2014/0046889 A1* | 2/2014 | Biem ..................... | G16H 70/20 706/46 |
| 2019/0265955 A1* | 8/2019 | Wolf ..................... | G06N 3/084 |

* cited by examiner

*Primary Examiner* — Kurtis Gills
(74) *Attorney, Agent, or Firm* — Terrile, Cannatti & Chambers; Stephen A. Terrile (57) ABSTRACT

A system, method, and computer-readable medium for performing a domain specific evaluation operation comprising: storing domain specific data within a business query repository; determining and understanding variations within language for a domain specific category; performing a test planner operation on an identified NLP system, the test planner operation allowing a user to select a test plan to apply to the identified NLP system; and, evaluating the identified NLP system using a text planner output.

20 Claims, 9 Drawing Sheets

```
# Method 1 Python implementation of Yule's I without nltk
import collections
import re def tokenize (s) :
    tokens = re.split (r"[^0-9A-Za-z\-'_] +", s)
    try :
        return tokens
    except:
        return 0 def get_yules (s) :
    * * *
    Returns a tuple with Yule's K and Yule's I.
    (cf. Oakes, M.P. 1998. Statistics for Corpus Linguistics.
    International Journal of Applied Linguistics, Vol 10 Issue 2)
    * * *
    tokens = tokenize (s)
    token_counter = collections.Counter(tok.upper ( ) for tok in tokens)
    m1 = sum(token_counter.values ( ) )
    m2 = sum( [freq ** 2 for freq in token_counter.values ( ) ] )

try :
        i = (m1*m1) / (m2-m1)
    except ZeroDivisionError:
        i = 0
    try :
        k + 1/i * 10000
    except ZeroDivisionError:
        k = 0
    try :
        return 1
    except ZeroDivisionError:
        return 0
```

FIG. 4

| NUMBER | DETAILED PROBLEM DESCRIPTION | CATEGORY | DETAIL |
|---|---|---|---|
| 1 | CUSTOMER NEEDS TO RETURN THE LATITUDE AND THE DOCK SINCE THE WRONG | CARE | RETURN REQUEST (IN POLICY) |
| 2 | ORDER WAS ENTERED INCORRECTLY. IT SHOULD HAVE BEEN AT NO CHARGE ORIG | CARE | CREDIT REQUEST |
| 3 | CUSTOMER REQUESTED CANCELLATION OF ORDER 252935316 BECAUSE OF BAC | CARE | RETURN REQUEST (IN POLICY) |
| 4 | ORDER # 252366124 ITS OVER CHARGED FOR $17.50 REQUEST FOR REFUND TO | CARE | CREDIT REQUEST |
| 5 | DSA REVERTED SHIPPING ADDRESS TO WRONG LOCATION PLEASE UPDATED SHI | CARE | MISSING, WRONG, OR DAMAGED (MWD) |
| 6 | PLEASE EXECUTE A RETURN FOR ORDER 260148472. CUSTOMER REACHED OUT | CARE | RETURN REQUEST (IN POLICY) |
| 7 | TEAM, CAN YOU PLEASE SET UP AN OUT OF POLICY RETURN FOR THE FOLLOWING | CARE | RETURN REQUEST (OUTSIDE POLICY) |
| 8 | PLEASE PROVIDE THE DELIVERY CONFIRMATION OR ESTIMATED DELIVERY DATE | CARE | PROOF OF DELIVERY REQUEST |
| 9 | TEAM, PLEASE ASSIST WITH RMA FOR ORDER 256371294 ITEM# A8103364 ( | CARE | RETURN REQUEST (IN POLICY) |

FIG. 5

```
# Remove any rows with blank entries
df.dropna (inplace=True)
df.head (5)

test = df [' Detailed Problem Description '] .iloc [0]
total_entries = len (df [' Number '])

print df [' Detailed Problem Description '] .iloc [0]
print total_entries
```

Understand the Categories in the Business Specific Data

Understand the number or unique categories in the Business Specific Data unique_categories = df.Category.unique ( )
total_categories = len (df.Category.unique ( ) )

```
print df.Category.unique ( )
print total_categories
# print unique_categories [1]
```

['Care' 'Order Processing' 'Tech Support' ' '
 'Other Not Listed / Do Not Know' 'CQM (Product Quality) ' 'Fulfillment'
 'Finance' 'Account Maintenance' 'GRS Acct Level Support' ]
10

FIG. 8

```
for x in range (0, total_categories) :
    delta = pd.DataFrame . from_records (df)
    query = delta [ ' Category ' ] . str . contains (unique_categories [x] )
    delta_filtered = delta [ query ]
    delta_percent = float ( (len (delta_filtered) / total_entries) * 100)
    print unique_categories [x] , ' : ', delta_percent, '% of total '
    print np.mean (delta_filtered.Yules)
    print np.std (delta_filtered.Yules)
    print len (delta_filtered)
```

```
print np.mean (delta_filtered.Yules)
print np.std (delta_filtered.Yules)
print len (delta_filtered)
```

| PRE ENHANCEMENT | | POST ENHANCEMENT | |
| --- | --- | --- | --- |
| LD SAMPLE | PASS/FAIL | LD SAMPLE | PASS/FAIL |
| 41 | PASS | 85 | PASS |
| 231 | FAIL | 181 | PASS |
| ○○○ | ○○○ | ○○○ | ○○○ |
| 150 | FAIL | 201 | FAIL |

| print np.mean (delta_filtered.Yules) | 119.538461538 |
| print np.std (delta_filtered.Yules) | 77.752680275 |
| print len (delta_filtered) | 13 |

ESTABLISHING A PROFICIENCY BASELINE FOR ANY DOMAIN SPECIFIC NATURAL LANGUAGE PROCESSING

BACKGROUND OF THE INVENTION

Field of the Invention

The present invention relates to information handling systems. More specifically, embodiments of the invention relate to establishing a proficiency baseline for domain specific natural language processing.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many businesses and organizations provide their own domain specific (i.e. Retail, Health, Technology, etc.) customer support capabilities for both their internal and end user customers. A customer's request for assistance to help them clarify or solve their needs can take many forms, such as appointments, tickets, calls, emails, etc. These requests are referred to as Cases.

SUMMARY OF THE INVENTION

The invention relates to a system, method, and computer-readable medium for performing a domain specific evaluation operation comprising: storing domain specific data within a business query repository; determining and understanding variations within language for a domain specific category; performing a test planner operation on an identified NLP system, the test planner operation allowing a user to select a test plan to apply to the identified NLP system; and, evaluating the identified NLP system using a text planner output. In various embodiments, the domain specific evaluation operation comprehensively evaluates a domain specific NLP system, which can include an NLP application, service, or device, based on lexical diversity measurements associated with the categories of queries the NLP system is anticipated to handle.

With the domain specific evaluation operation, a domain specific NLP system is evaluated based on lexical diversity to establish a true proficiency baseline. This baseline indicates how well the NLP system will perform in a real-life setting. In various embodiments, the domain specific evaluation operation is performed via a domain specific evaluation system. In various embodiments, the domain specific evaluation operation receives a collection of domain specific business data, including data regarding areas in which customers typically ask for assistance, the domain specific business data is then sorted into categories and stored within a Business Query Database. A statistical variation model (which is associated with a lexical diversity profile) for each category is then obtained. An expected category mix is also obtained. A test planner operation is then performed. The test planner operation translates the information within the statistical models into useable test strategies for NLP evaluation. The domain specific evaluation operation then provides test cases to an existing NLP system via the evaluation engine and determines a NLP proficiency score based on NLP test plan responses vs. design expectations.

Accordingly, in certain embodiments the domain specific evaluation operation comprehensively evaluates any domain specific NLP system to determine lexical diversity visualization of NLP proficiency performance based on a lexical diversity distribution.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 5 shows a sample of a portion of a business query repository.

FIG. 6 shows example code for preparing the data within the business query repository for evaluation.

DETAILED DESCRIPTION

Various aspects of the present disclosure include an appreciation that domain specific cases are increasingly being managed and resolved in a customer support virtual environment, without the need for human interaction. These customer support virtual environments which provide a customer with a clickless or contactless resolution experience. Various aspects of the present disclosure include an appreciation that Natural Language Processing (NLP) functionality is needed within the customer support virtual environment.

Various aspects of the present disclosure include an appreciation that an important component of a positive customer support experience is the ability to accurately interpret a customer's support needs in a digital channel. However, as the human language is so complex, variable (there are many different ways to express the same meaning), and polysemous (the same word or phrase may mean many things in different contexts), comprehensively evaluating a domain specific NLP application, service or device can present a technical challenge.

Various aspects of the present disclosure include an appreciation that while many NLP technologies exist, the design of these systems often fail to provide a domain specific evaluation of the accuracy of the chosen NLP solution. Providing a domain specific evaluation can be challenging due to a need to provide a subjective set of performance measurements, specific by domain type, which can require a subject matter expertise to interpret etc. Accordingly, it would be desirable to provide effective, evaluation mechanisms to measure NLP technology performance in real world, domain specific, contexts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
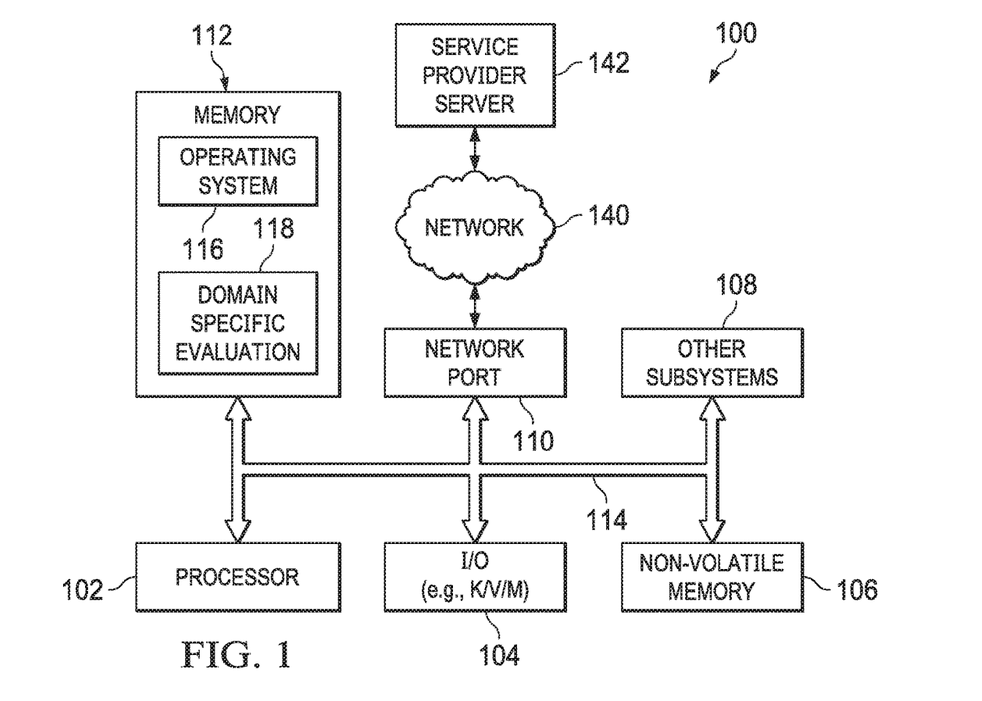
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a domain specific evaluation system 118.

In various embodiments, the domain specific evaluation system 118 perform a domain specific evaluation operation. In various embodiments, the domain specific evaluation operation comprehensively evaluates a domain specific NLP system, which can include an NLP application, service, or device, based on lexical diversity measurements associated with the categories of queries the NLP system is anticipated to handle.

With the domain specific evaluation operation, a domain specific NLP system is evaluated based on lexical diversity to establish a true proficiency baseline. This baseline indicates how well the NLP system will perform in a real-life setting. In various embodiments, the domain specific evaluation operation is performed via a domain specific evaluation system. In various embodiments, the domain specific evaluation operation receives a collection of domain specific business data, including data regarding areas in which customers typically ask for assistance, the domain specific business data is then sorted into categories and stored within a Business Query Database. A statistical variation model (which is associated with a lexical diversity profile) for each category is then obtained. An expected category mix is also obtained. A test planner operation is then performed. The test planner operation translates the information within the statistical models into useable test strategies for NLP evaluation. The domain specific evaluation operation then provides test cases to an existing NLP system via the evaluation engine and determines a NLP proficiency score based on NLP test plan responses vs. design expectations.

Figure 2:
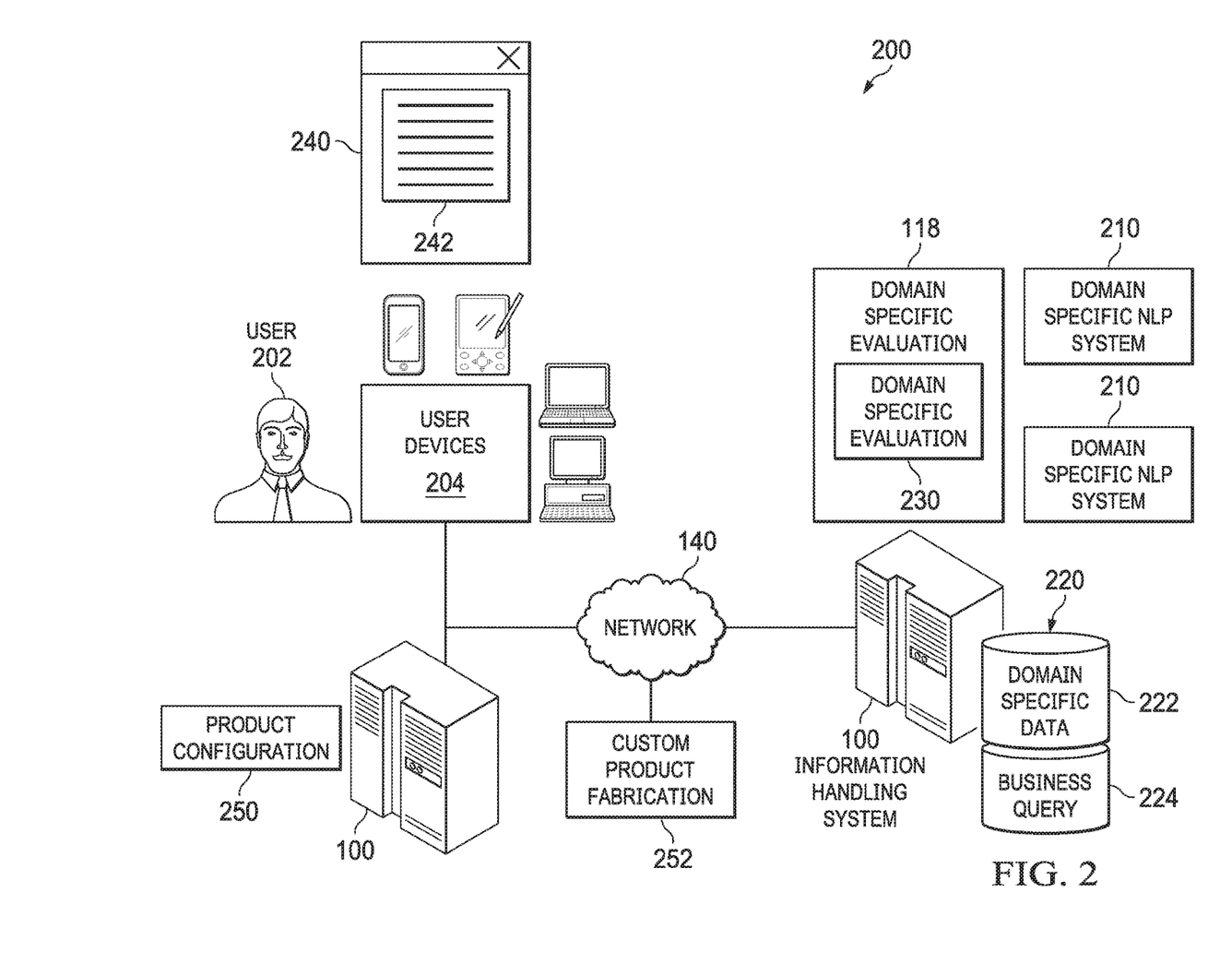
FIG. 2 shows a block diagram of a domain specific evaluation environment.

FIG. 2 is a block diagram of a customer service interaction estimation environment 200 implemented in accordance with an embodiment of the invention. The customer service interaction estimation environment includes a customer service interaction estimation system 118 as well as one or more natural language processing systems 210. In various embodiments, the natural language processing system 210 is a domain specific natural language processing system. For the purposes of this disclosure a domain specific natural language processing system comprises an NLP system designed to function within a particular domain. A domain specific NLP system includes many independent, specialized knowledge structures, rather than one cohesive knowledge structure. Thus one domain specific NLP system (i.e., an NLP system functioning within a particular domain) may not have an impact on another independent domain specific NLP system (i.e., an NLP system functioning within another particular domain). In certain embodiments, a particular domain corresponds to a particular business type (i.e., a business associated with a specific group, thing or category which is not general or universal).

In various embodiments, a user 202 generates a customer service interaction estimation user query which is provided to the customer service interaction estimation system 118. In various embodiments, a customer service interaction estimation system 118 executes on a hardware processor of an information handling system 100. In various embodiments, the user 202 may use a user device 204 to interact with the customer service interaction estimation system 118.

As used herein, a user device 204 refers to an information handling system such as a personal computer, a laptop computer, a tablet computer, a personal digital assistant (PDA), a smart phone, a mobile telephone, or other device that is capable of communicating and processing data. In various embodiments, the user device is configured to present an estimation user interface 240. In various embodiments, the estimation user interface 240 presents a graphical representation 242 of customer service interaction estimations which are automatically generated in response to a user interaction. In various embodiments, the user device 204 is used to exchange information between the user 202 and the customer service interaction estimation system 118 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the domain specific evaluation system 118 includes a domain specific evaluation module 230 which performs a domain specific evaluation operation. In various embodiments, the domain specific evaluation environment 200 includes a storage repository 220. The storage repository may be local to the system executing the domain specific evaluation system 118 or may be executed remotely. In various embodiments, the storage repository includes one or more of domain specific data repository 222 and a business query repository 224.

In various embodiments, the domain specific evaluation system 118 interacts with the NLP system 210 which may be executing on a separate information handling system. In various embodiments, the domain specific evaluation system 118 interacts with a product configuration system 250 which may be executing on a separate information handling system 100. In various embodiments, the product configuration system 250 interacts with a custom product fabrication system 252. In various embodiments, the custom product fabrication system 252 fabricates products to include components identified using the domain specific evaluation system 118. In various embodiments, a domain specific evaluation user interface 240 may be presented via a website. In various embodiments, the website is provided by one or more of the domain specific evaluation system 118 and the product configuration system 250.

For the purposes of this disclosure a website may be defined as a collection of related web pages which are identified with a common domain name and is published on at least one web server. A website may be accessible via a public internet protocol (IP) network or a private local network. A web page is a document which is accessible via a browser which displays the web page via a display device of an information handling system. In various embodiments, the web page also includes the file which causes the document to be presented via the browser. In various embodiments, the web page may comprise a static web page which is delivered exactly as stored and a dynamic web page which is generated by a web application that is driven by software that enhances the web page via user input to a web server.

Figure 3:
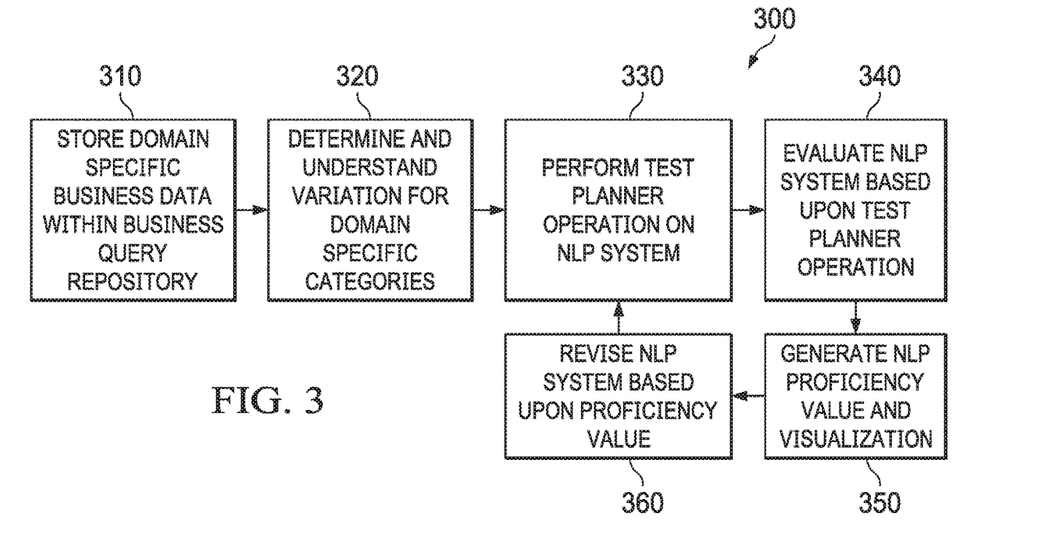
FIG. 3 shows a flow chart of a domain specific evaluation operation.

Referring to FIG. 3, a flow chart of a domain specific evaluation operation 300 is shown. More specifically, the domain specific evaluation operation 300 starts by storing domain specific data within a business query repository at step 310. In certain embodiments, the business query repository corresponds to the business query repository 224. Next, at step 320 the domain specific evaluation operation 300 determines and understands variations within the language for domain specific categories. In certain embodiments, the determination and understanding of variation is performed using lexical diversity measurements.

Next, at step 330, the domain specific evaluation operation 300 performs a test planner operation on an identified NLP system to allow a user to select an optimal test plan to apply to the identified NLP system. In certain embodiments, the optimal test plan includes a hypothesis testing type test plan. In certain embodiments, for a hypothesis testing type test plan, a statistical p value indicates whether the test hypothesis can be accepted or not. Next, at step 340 the domain specific evaluation operation 300 evaluates the identified NLP system using a randomized text planner output. In various embodiments, the identified NLP system is designed based upon specific business intents and/or specific questions. Next, at step 350, the domain specific evaluation operation 300 generates an NLP proficiency value based upon the evaluation performed during step 340. In certain embodiments, the domain specific evaluation operation 300 provides a visualization of the NLP evaluation and proficiency during step 350.

In certain embodiments, the domain specific evaluation operation 300 revises the NLP system at step 360 based upon the NLP proficiency value. In various embodiments, revising the NLP system can include identifying another NLP system which is better suited to the particular domain. In various embodiments, revising the NLP system can include additional training of the NLP system to function better within the particular domain. After the NLP system is revised, another test planner operation may be applied to the NLP system at step 330.

Accordingly, the domain specific evaluation operation 300 may be applied to any domain specific NLP application, service or device to evaluation the domain specific NLP application service or device based on lexical diversity to establish a true proficiency baseline. This baseline provides a measurable indication of how well the identified NLP system will perform in a real life setting. In certain embodiments, the NLP proficiency score is determined based on percentage Pass/Fail criteria of NLP responses vs. design expectations. In certain embodiments, the visualization includes a visualization of the pass/fail results mapped onto the lexical diversity distribution of a test case of interest.

More specifically, when storing domain specific data within the business query repository the domain specific evaluation system 118 analyzes collections of domain specific business data, including questions typically asked by customers in various domains, sorts this business data into categories and stores the sorted business data within the business query repository. In certain embodiments, the business query repository can include a category portion, a care portion, an order processing portion and a finance portion. For example, the category portion might include an entry for "Customer Request," the care portion might include an entry for "Order #123,456 was overcharged by $17.50. Request refund to save the sale, the order processing portion might include an entry for "Due to a delay with the Lease agreement being sent out to be signed (order address change) customer needs to get this arranged asap," and the Finance portion might include an entry for "incorrect customer was billed, however since the orders are so old, the account team would like to write them off."

Figure 4:
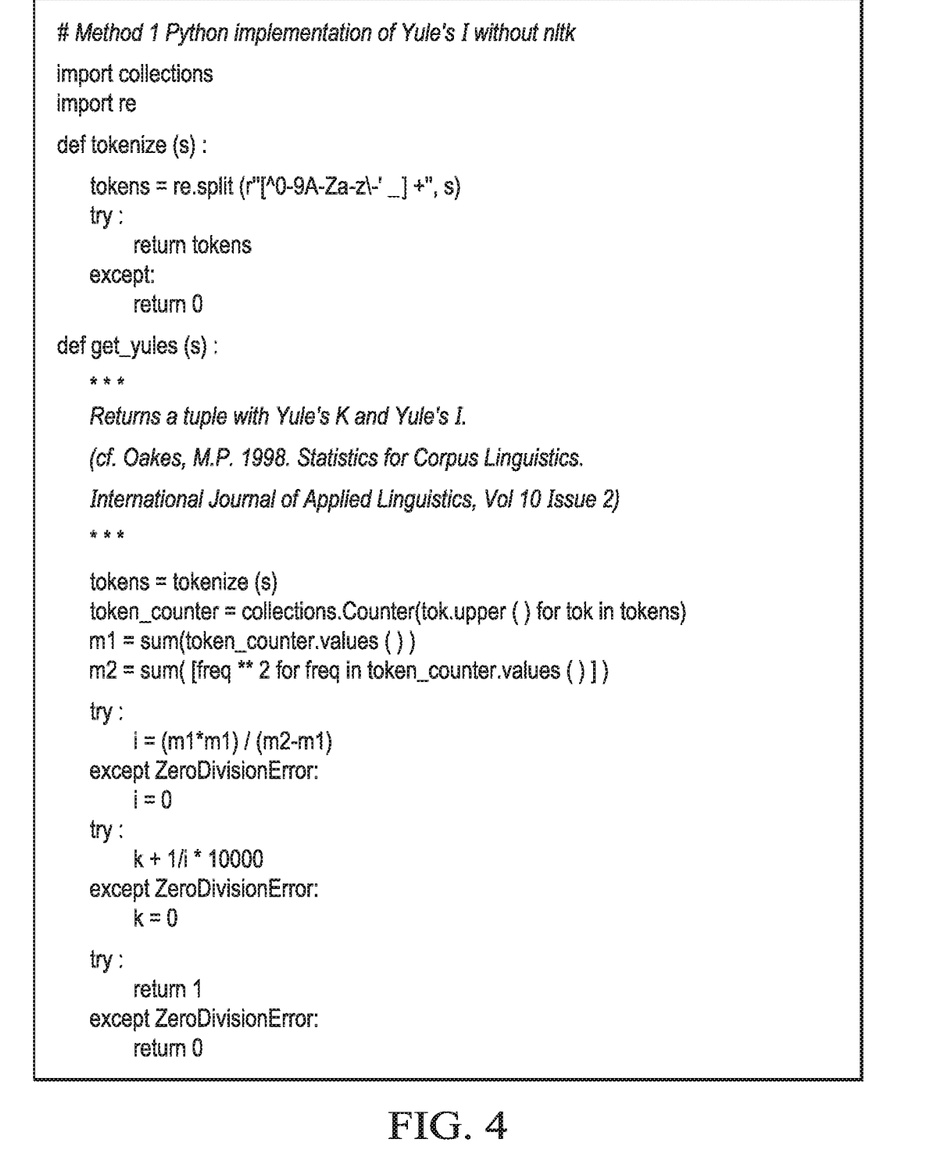
FIG. 4 shows an example Python programming language implementation for an operation for calculating Yule's I (the inverse of Yule's Characteristic K) as a measure of lexical diversity.

When determining and understanding variations within the language for domain specific categories the domain specific evaluation system 118 may generate a Yule's characteristic. The Yule's characteristic provides a type to token ratio (TTR) designed to avoid the issue of text length. FIG. 4 shows an example Python programming language implementation for an operation for calculating Yule's I (the inverse of Yule's Characteristic K) as a measure of lexical diversity. Lexical diversity provides a type to token ratio of a given text as a ratio of different unique word stems to a total number of works.

Referring to FIG. 5, a sample of a portion of a business query repository is shown. More specifically, in various embodiments, each entry in the business query repository includes a number portion, a detailed problem description portion, a category portion and a detail portion. The number portion stores an internal reference number. The detailed problem description portion stores a description of a domain specific problem. In certain embodiments, the description is relatively short (e.g., less than 100 characters). In certain embodiments, the description of generated by a team member such as a sales team member. The category portion stores a representation of a request type. In certain embodiments, the request type can indicate a department or other organization where the application (e.g., the NLP system) should direct the sales requester for support. The detail portion provides a next level of detailed root cause associated with the category of the entry.

Figure 7:
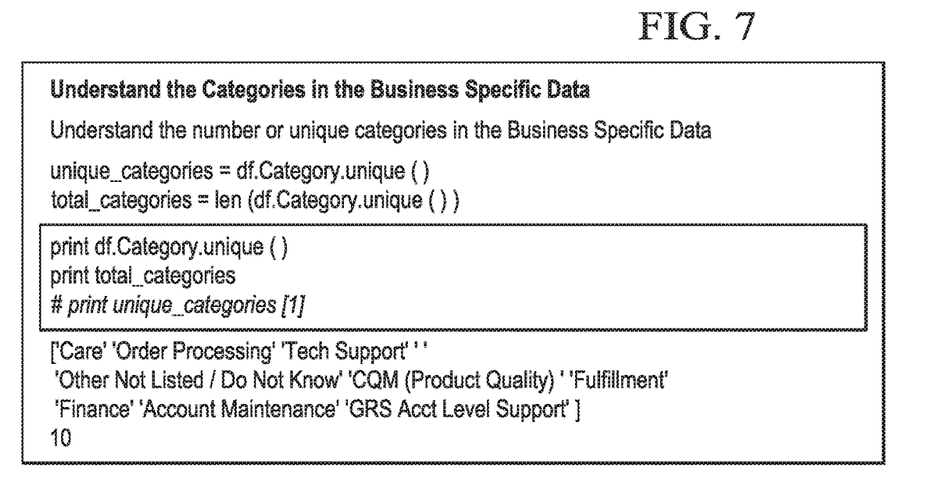
FIG. 7 shows example code for understanding the categories within the business query repository.

Referring to FIGS. 6 and 7, in certain embodiments, the business query repository is evaluated for completeness of the dataset. FIG. 6 shows example code for preparing the data within the business query repository for evaluation. FIG. 7 shows example code for understanding the categories within the business query repository.

In certain embodiments, the completeness evaluation takes into account populated cells within the business query repository vs. gaps in information. In certain embodiments, the business query repository can include a plurality of categories of requests against which the NLP system is evaluated. In various embodiments, the categories of interest may be based upon the specific domain.

In certain embodiments, the domain specific evaluation operation 300 determines and understands variations within the business query repository by performing a lexical diversity analysis for each category within the business query repository. Lexical diversity refers to a range of different words used in a text, with a greater range indicating a higher diversity. For example, when designing an automobile, the design engineers test the prototype vehicle across the known range of operational parameters that it will encounter in its lifetime (e.g., operating temperature ranges of −40 to +40 degrees Celsius). When evaluating an NLP system, understanding lexical diversity is an important element for a systematic evaluation system for an NLP system.

For example when performing a lexical diversity analysis on a plurality of example texts the first of which keeps repeating the same few words again and again (for example: manager, thinks and finishes) vs a text which avoids most repetition and instead uses different vocabulary for the same ideas (for example, manager, boss, chief, head, and leader; thinks, deliberates, ponders, and reflects; and, finishes, completes and finalizes). The second text is likely to be more complex and more difficult. Thus, the second text is considered to have more lexical diversity than the first text. As such lexical diversity provides an important measure of text difficulty. If a text has a higher index of lexical diversity (referred to as LD or D), the text is likely to be more complex, more advanced and more difficult.

Lexical diversity analysis may be performed using one or more of a plurality of lexical diversity operations. More specifically, a lexical diversity analysis can include Yule's I characteristic analysis, a measure of textual lexical diversity (MTLD) analysis and a hypergeometric distribution (HD) analysis.

With the Yule's I characteristic analysis, Yule's I=(M1*M1)/(M2−M1) where M1 is the number of all word forms a text includes and M2 is the sum of the products of each observed frequency to the power of two and the number of word types observed with that frequency. For example, if one word occurs three times and four words occur five times, M2=(1·3²)+(4·5²)=109. The larger Yule's K, the smaller the diversity of the vocabulary (and thus, arguably, the easier the text). Since Yule's I is based on the reciprocal of Yule's K, the larger Yule's I, the larger the diversity of the vocabulary (and thus, arguably, the more difficult the text).

The measure of textual lexical diversity analysis employs a sequential analysis of a sample to estimate an LD score. Conceptually, measure of textual lexical diversity analysis reflects the average number of words in a row for which a certain TTR is maintained. To generate a score, measure of textual lexical diversity analysis calculates the TTR for increasingly longer parts of the sample. Every time the TTR drops below a predetermined value, a count (called the factor count) increases by 1, and the TTR evaluations are reset. The measure of textual lexical diversity analysis resumes from where it had stopped, and the same process is repeated until the last token of the language sample has been added and the TTR has been estimated. Then, the total number of words in the text is divided by total factor count. Subsequently, the whole text in the language sample is reversed and another score of measure of textual lexical diversity analysis is estimated. The forward and the reversed measure of textual lexical diversity analysis scores are averaged to provide a final MTLD estimate.

The hypergeometric distribution analysis creates a measure of LD referred to as the hypergeometric distribution (HD-D) which is a unique index representing unique lexical information. An assumption underlying a hypergeometric distribution analysis is that if a sample includes many tokens of a specific word, then there is a high probability of drawing a sample that will contain at least one token of that word. There can be strong linear correlations between HD-D and D scores. Because of this strong correlation, D can provide an approximation of HD-D expressed in a different metric. Further, the less than perfect correlations between the two measures can be attributed to the main difference in the nature of the two measures (the fact that D is based on random sampling and curve fitting, which introduces error in the estimation process, as opposed to HD-D, which is directly estimated based on probabilities of word occurrence in a language sample).

Figure 8:
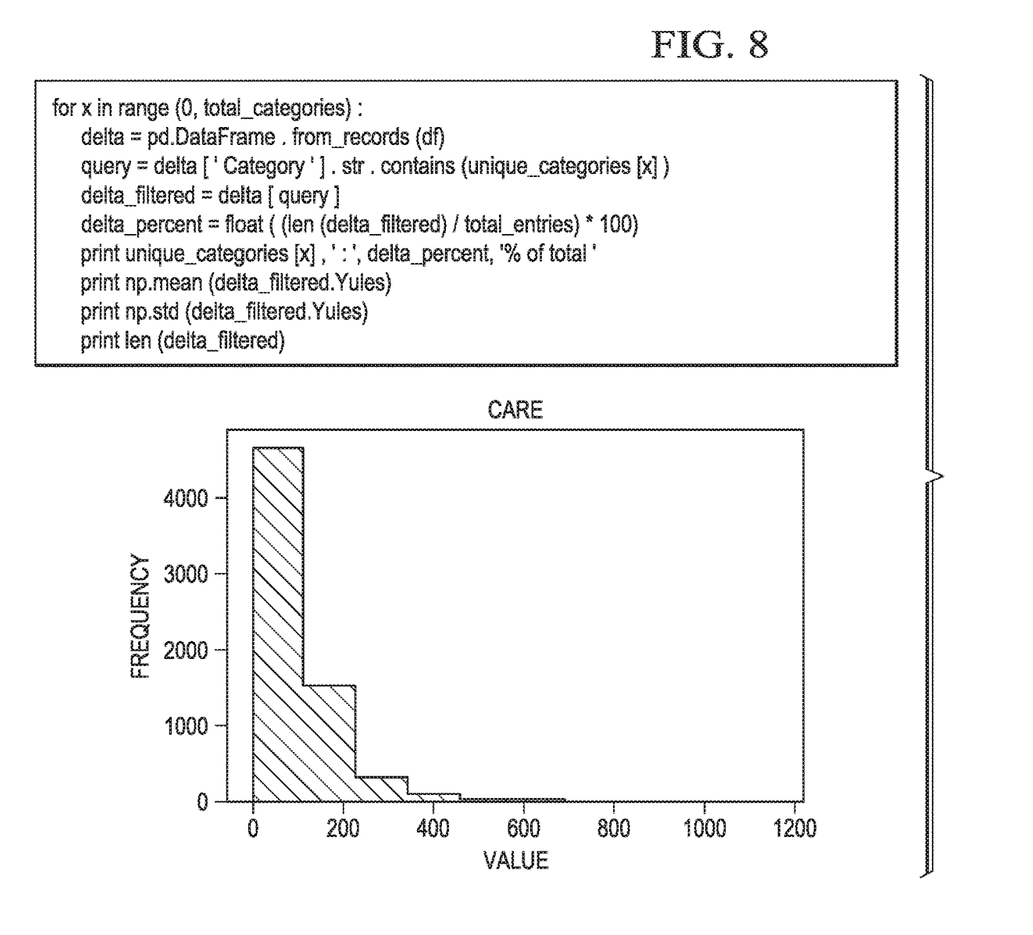
FIG. 8 shows an example distribution of lexical diversity across a category.

A feature of a hypergeometric distribution analysis is that it does not require a minimum of 50 tokens to be estimated. By default, D is required to estimate the average TTR for 50-token subsamples in order to establish the empirical curve that is modelled. If there are <50 tokens in the sample, the program terminates without providing a score for the specific sample. This can problematic for researchers who work with aphasia (PWA) (and other clinical populations), who often produce limited verbal output. The reason is twofold. First, language samples with <50 tokens that are discarded may lead to a loss of valuable information. Typically, more robust conclusions may be reached about a client's language skills the more data are available. Second, from a missing data theory perspective, only when data are missing at random or completely at random is the missing mechanism ignorable. Conversely, if the data are missing not at random, and this fact is ignored and the data are analyzed, statistical parameter estimates may include substantial bias that may lead to invalid inferences Referring to FIG. 8, an example distribution of lexical diversity across a category is shown. When performing a domain specific evaluation operation, there are some specific techniques that can be applied to understand the lexical diversity. For example with the example shown in FIG. 8, a Yule's I characteristic can be derived from each entry in the business query repository and the distribution of the values may be plotted. Thus, the domain specific evaluation operation transforms an array of text (or speech) based requests from a customer into a numerical distribution. Statistical models can then be applied to the numerical distribution to determine a suitable test plan. In certain embodiments, a sample size per category required to meet the acceptable statistical confidence limits of the NLP system may be determined.

Figure 9:
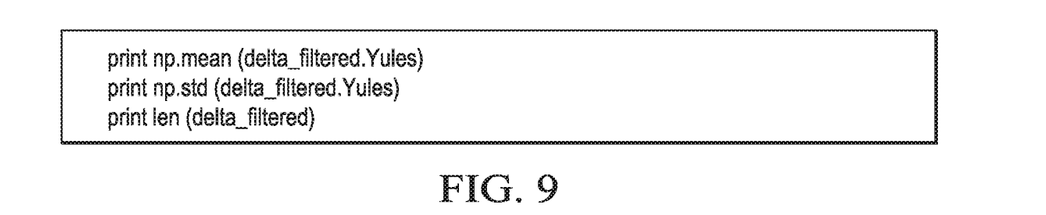
FIG. 9 shows an example of key statistics from a sample distribution.
Figure 10:
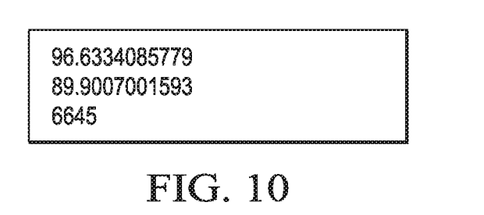
FIG. 10 shows an example of key statistics from a sample distribution.

The text based array in the business query repository is then transformed into a statistical model. For example, FIGS. 9 and 10 show examples of key statistics from a sample distribution.

A goal of the test planner operation is to translate the information within the statistical models into useable test strategies to evaluate a domain specific NLP application, service, or device. In certain embodiments, two primary test strategies are implemented by the test planner operation. With a first test strategy, all entries within the business query repository are tested. With another test strategy a sample set of entries within the business query database are tested.

Figure 11:
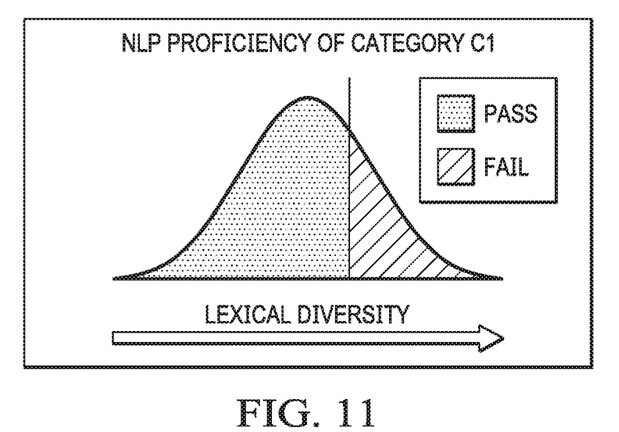
FIG. 11 shows a graphical representation of a NLP system pass/fail visualization mapped to category.
Figure 12:
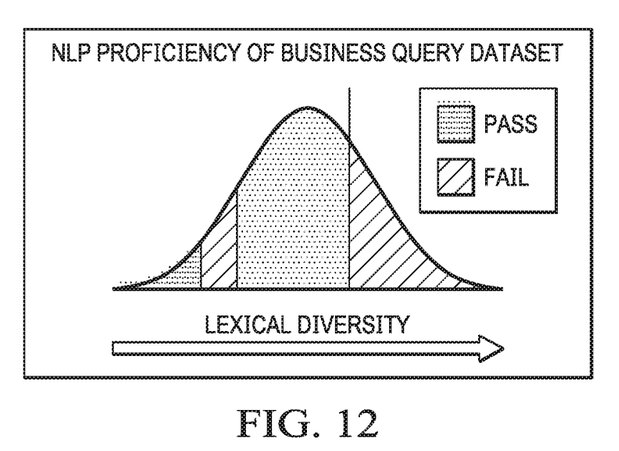
FIG. 12 shows a graphical representation of a NLP system pass/fail visualization mapped to a full business query dataset.

If time and computing bandwidth are not at limiting factor, then the test planner operation uses all entries within the business query repository. A concrete output of this approach is a visual representation of the lexical diversity input distribution mapped to the corresponding NLP pass/fail criteria. The mapping can be by category or to a whole dataset. These views enable an NLP Solution designer to observe NLP system behavior as it relates to language and/or category complexity. FIG. 11 shows a graphical representation of a NLP system pass/fail visualization mapped to category. FIG. 12 shows a graphical representation of a NLP system pass/fail visualization mapped to a full business query dataset.

Figure 13:
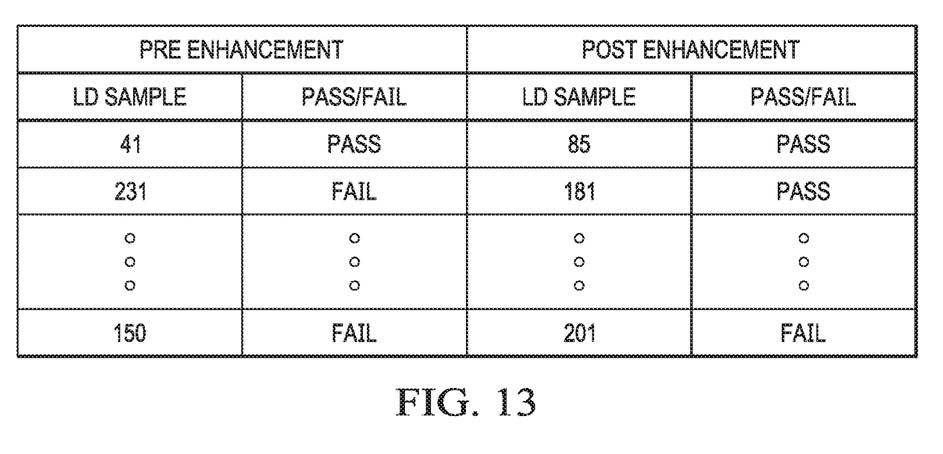
FIG. 13 shows an example of raw data from a two-sample t test.

If one or both of time and computing bandwidth are a limiting factory, then a test strategy using a sample set of entries is used. In certain embodiments, this strategy performs a two-Sample T test based on business query repository. The two-sample t test is a hypothesis test often used in the field of Six Sigma work. The two-sample t test is applied to compare whether an average difference between two groups is significant or if the difference is due instead to random chance. In this context, the test strategy answers questions such as whether the average NLP proficiency score is higher after implementing a new enhancement to an NLP system design than before, or whether the test results of specific lexical diversity selections (i.e. highly complex statements, or categories) are better than test results of an alternative selection. FIG. 13 shows an example of raw data from a two-sample t test.

Figure 14:
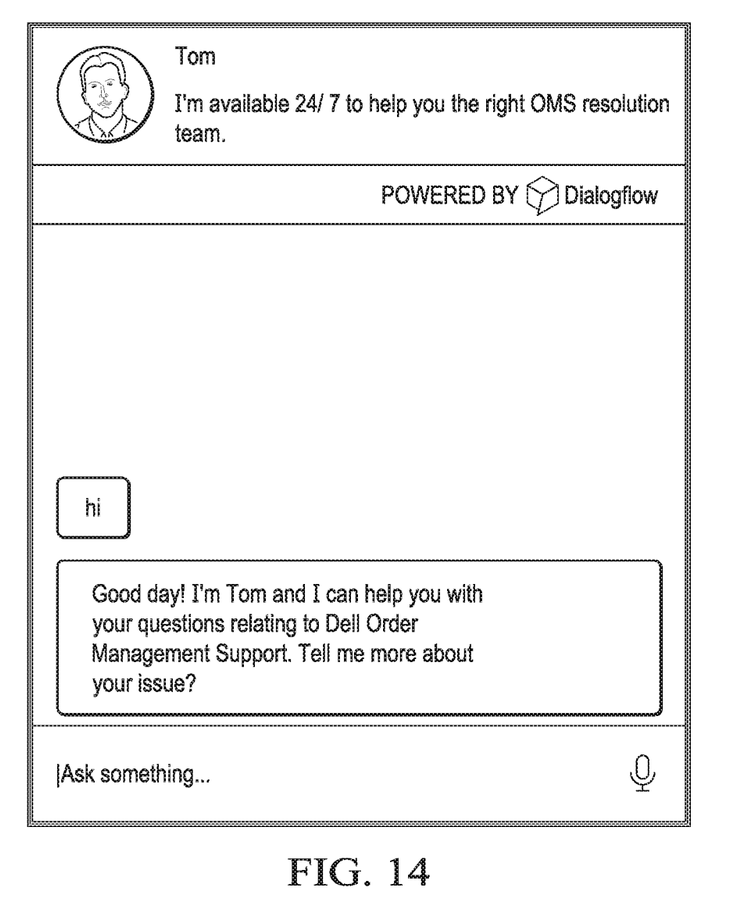
FIG. 14 shows an example screen presentation of the NLP system when applying the domain specific evaluation operation to the NLP system.

Applying the domain specific evaluation operation to a particular NLP system (e.g., the Dialogflow NLP engine), provides a comprehensive evaluation of the particular NLP system. For example, FIG. 14 shows an example screen presentation of the NLP system when applying the domain specific evaluation operation to the NLP system.

The domain specific evaluation operation uses lexical diversity measurements as part of the comprehensive evaluation of the particular NLP system. The evaluation of the particular NLP system establishes a proficiency baseline of the NLP system for a specific domain (i.e., a category of interest (e.g., a finance category)).

Figure 15:
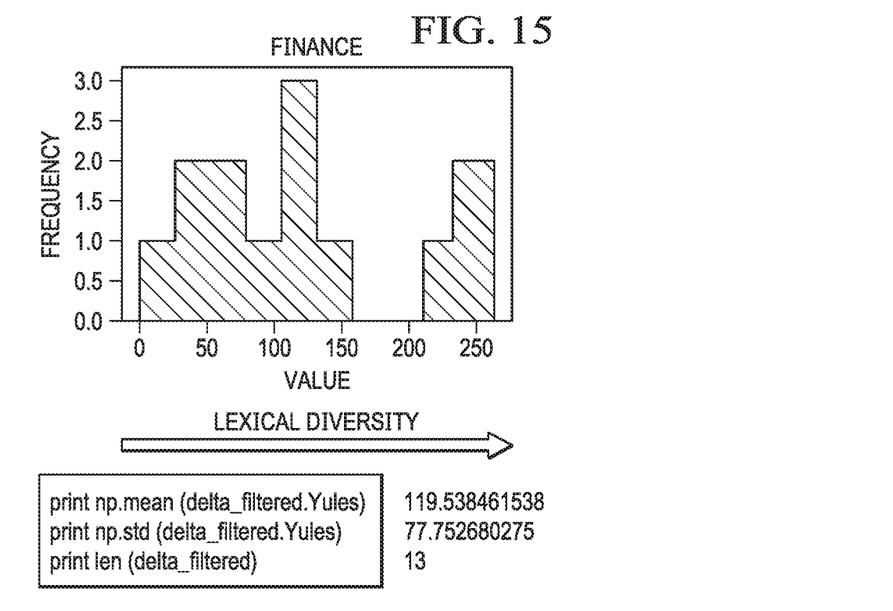
FIG. 15 shows an example distribution of lexical diversity across a finance category.
Figure 16:
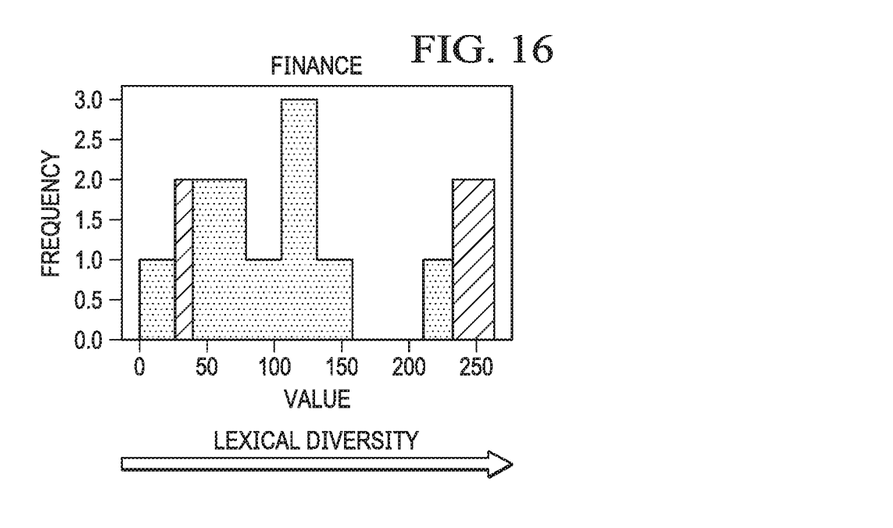
FIG. 16 shows an example NLP system pass/fail visualization mapped to the particular category.

FIG. 15 shows an example distribution of lexical diversity across a finance category. When evaluating the particular NLP system, the domain specific evaluation operation analyzes all data from the specific category within the business query database and determines variation in each category using lexical diversity. A test planner operation is also applied to the NLP system to determine an optimum test plan. The domain specific evaluation operation than uses a socket.io plugin to input test cases to the evaluation system. For the particular NLP system the domain specific evaluation operation then determined an NLP proficiency score of 80%. FIG. 16 shows an example NLP system pass/fail visualization mapped to the particular category.

Figure 17:
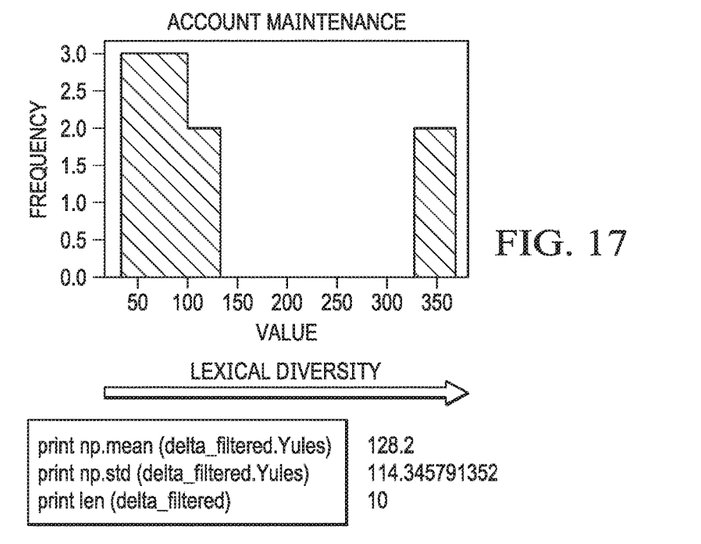
FIG. 17 shows an example distribution of lexical diversity across an account maintenance category.

The domain specific evaluation operation uses lexical diversity measurements as part of the comprehensive evaluation of the particular NLP system for the plurality of categories of interest. The evaluation of the particular NLP system establishes a proficiency baseline of the NLP system for specific domains (i.e., categories of interest (e.g., a finance category vs. an account maintenance category)). More specifically, the domain specific evaluation operation uses a two sample t test to statistically define differences and similarities between the two categories. FIG. 17 shows an example distribution of lexical diversity across an account maintenance category.

Figure 18:
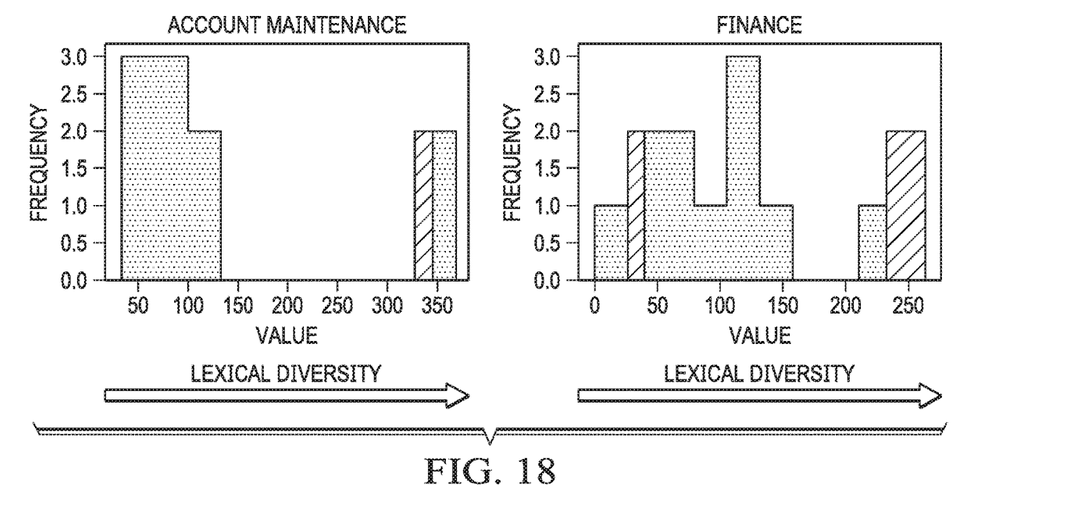
FIG. 18 shows an example NLP system pass/fail visualization mapped to the plurality of categories.

When evaluating the particular NLP system, the domain specific evaluation operation analyzes data from the categories of interest within the business query database and determines variation in each category using lexical diversity. A test planner operation is also applied to the NLP system to determine an optimum test plan including hypothesis testing. The domain specific evaluation operation than uses a socket.io plugin to input test cases to the evaluation system. The domain specific evaluation operation then determines an NLP proficiency score for each category and visualization based on NLP responses vs. design expectations. The domain specific evaluation operation also generates a p value to indicate if the lexical diversity is influencing performance across categories. FIG. 18 shows an example NLP system pass/fail visualization mapped to the plurality of categories.

To determine whether the difference between the population means is statistically significant, the domain specific evaluation operation compares a p-value to a significance level. In certain embodiments, a significance level (denoted as α or alpha) of 0.05 is used. A significance level of 0.05 indicates a 5% risk of concluding that a difference exists when there is no actual difference.

When the P-value ≤α, the difference between the means is statistically significant and should be rejected (e.g., Reject the null hypothesis (H0)). If the p-value is less than or equal to the significance level, the decision is to reject the null hypothesis. The domain specific evaluation operation concludes that the difference between the population means is statistically significant. In various embodiments, the domain specific evaluation operation uses specialized (i.e., domain specific) knowledge to determine whether the difference is practically significant.

When the P-value >α, the difference between the means is not statistically significant and should be accepted (e.g., fail to reject the null hypothesis (H0)). If the p-value is greater than the significance level, the decision is to fail to reject the null hypothesis. The domain specific evaluation operation concludes that the difference between the population means is statistically significant. In various embodiments, the domain specific evaluation operation then assures that the test has enough power to detect a difference that is practically significant.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Python, Java, Smalltalk, C++ or the like. However, the computer program code for carrying out operations of the present invention may also be written in conventional procedural programming languages, such as the "C" programming language or 'R' and similar programming languages. The operations of the present invention can also be implemented using software packages such as SAS, IBM Watson or software packages which support Machine Learning algorithms. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A method for performing a domain specific evaluation operation within a customer service interaction estimation environment, the customer service interaction environment comprising a customer service interaction estimation system executing on a hardware processor of an information handling system, the method comprising:

storing domain specific data within a business query repository;

determining and understanding variations within language for a domain specific category;

performing a test planner operation on an identified natural language processing (NLP) system, the test planner operation allowing a user to select a test plan to apply to the identified NLP system, the identified NLP system comprising a domain specific NLP system, the domain specific NLP system being designed to function within a specific domain;

evaluating the identified NLP system using a test planner output, the evaluating establishing a proficiency baseline of the identified NLP system for the specific domain, the specific domain corresponding to the domain specific category, the proficiency baseline indicating how well the identified NLP system performs in the specific domain corresponding to the domain specific category;

training the identified natural language processing system to function within the specific domain based upon the proficiency baseline of the identified NLP system for the specific domain; and, fabricating a product via a custom product fabrication system, the product being fabricated to include components identified via the identified natural language processing system.

2. The method of claim 1, wherein:
the determining and understanding of variation is performed using lexical diversity measurements.

3. The method of claim 2, wherein:
the lexical diversity measurements are associated with the categories of queries the identified NLP system is anticipated to handle.

4. The method of claim 1, wherein:
the test plan includes a hypothesis testing type test plan, the hypothesis testing type test plan using a statistical p value to indicate whether a test hypothesis can be accepted or not.

5. The method of claim 1, wherein:
the identified NLP system is designed based upon at least one of specific business intents and specific questions.

6. The method of claim 1, further comprising:
generating an NLP proficiency value based upon the evaluating, the NLP proficiency value providing an indication of proficiency of the identified NLP system; and,
presenting the NLP proficiency value via a domain specific evaluation user interface, the domain specific evaluation user interface being presented via a user device, the domain specific evaluation user interface providing a visualization the proficiency of the identified NLP system.

7. A system comprising:
a hardware processor;
a data bus coupled to the processor; and
a non-transitory, computer-readable storage medium embodying computer program code for performing a domain specific evaluation operation within a customer service interaction estimation environment, the customer service interaction environment comprising a customer service interaction estimation system executing on the hardware processor of the system, the non-transitory, computer-readable storage medium being coupled to the data bus, the computer program code interacting with a plurality of computer operations and comprising instructions executable by the processor and configured for:
storing domain specific data within a business query repository;
determining and understanding variations within language for a domain specific category;
performing a test planner operation on an identified natural language processing (NLP) system, the test planner operation allowing a user to select a test plan to apply to the identified NLP system, the identified NLP system comprising a domain specific NLP system, the domain specific NLP system being designed to function within a specific domain;
evaluating the identified NLP system using a test planner output, the evaluating establishing a proficiency baseline of the identified NLP system for the specific domain, the specific domain corresponding to the domain specific category, the proficiency baseline indicating how well the identified NLP system performs in the specific domain corresponding to the domain specific category;
training the identified natural language processing system to function within the specific domain based upon the proficiency baseline of the identified NLP system for the specific domain; and,
fabricating a product via a custom product fabrication system, the product being fabricated to include components identified via the identified natural language processing system.

8. The system of claim 7, wherein:
the determining and understanding of variation is performed using lexical diversity measurements.

9. The system of claim 8, wherein:
the lexical diversity measurements are associated with the categories of queries the identified NLP system is anticipated to handle.

10. The system of claim 7, wherein:
the test plan includes a hypothesis testing type test plan, the hypothesis testing type test plan using a statistical p value to indicate whether a test hypothesis can be accepted or not.

11. The system of claim 7, wherein:
the identified NLP system is designed based upon at least one of specific business intents and specific questions.

12. The system of claim 7, wherein the instructions are further configured for:
generating an NLP proficiency value based upon the evaluating, the NLP proficiency value providing an indication of proficiency of the identified NLP system; and,
presenting the NLP proficiency value via a domain specific evaluation user interface, the domain specific evaluation user interface being presented via a user device, the domain specific evaluation user interface providing a visualization the proficiency of the identified NLP system.

13. A non-transitory, computer-readable storage medium embodying computer program code for performing a domain specific evaluation operation within a customer service interaction estimation environment, the customer service interaction environment comprising a customer service interaction estimation system executing on a hardware processor of an information handling system, the computer program code comprising computer executable instructions configured for:
storing domain specific data within a business query repository;
determining and understanding variations within language for a domain specific category;
performing a test planner operation on an identified natural language processing (NLP) system, the test planner operation allowing a user to select a test plan to apply to the identified NLP system, the identified NLP system comprising a domain specific NLP system, the domain specific NLP system being designed to function within a specific domain; and,
evaluating the identified NLP system using a test planner output, the evaluating establishing a proficiency baseline of the identified NLP system for the specific domain, the specific domain corresponding to the domain specific category, the proficiency baseline indicating how well the identified NLP system performs in the specific domain corresponding to the domain specific category;
training the identified natural language processing system to function within the specific domain based upon the proficiency baseline of the identified NLP system for the specific domain; and, fabricating a product via a custom product fabrication system, the product being fabricated to include components identified via the identified natural language processing system.

14. The non-transitory, computer-readable storage medium of claim 13, wherein:
the determining and understanding of variation is performed using lexical diversity measurements.

15. The non-transitory, computer-readable storage medium of claim 14, wherein:
the lexical diversity measurements are associated with the categories of queries the identified NLP system is anticipated to handle.

16. The non-transitory, computer-readable storage medium of claim 13, wherein:
the test plan includes a hypothesis testing type test plan, the hypothesis testing type test plan using a statistical p value to indicate whether a test hypothesis can be accepted or not.

17. The non-transitory, computer-readable storage medium of claim 13, wherein:
the identified NLP system is designed based upon at least one of specific business intents and specific questions.

18. The non-transitory, computer-readable storage medium of claim 13, wherein the computer executable instructions are further configured for:
generating an NLP proficiency value based upon the evaluating, the NLP proficiency value providing an indication of proficiency of the identified NLP system; and,
presenting the NLP proficiency value via a domain specific evaluation user interface, the domain specific evaluation user interface being presented via a user device, the domain specific evaluation user interface providing a visualization the proficiency of the identified NLP system.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

* * * * *